United States Patent [19]

Plugge et al.

[11] 4,096,530

[45] Jun. 20, 1978

[54] METHOD AND APPARATUS FOR OBSCURING THE RASTER LINES IN A PHOTOGRAPH OF A VIDEO MONITOR SCREEN

[75] Inventors: Jay S. Plugge, Brookfield; William H. Wesbey; James E. Blake, both of New Berlin, all of Wis.

[73] Assignee: General Electric Company, Schenectady, N.Y.

[21] Appl. No.: 696,880

[22] Filed: Jun. 17, 1976

[51] Int. Cl.² ........................ H04N 5/04; H04N 5/84
[52] U.S. Cl. .................................. 358/244; 358/152; 360/35; 360/37
[58] Field of Search ............... 358/244, 130, 131, 251, 358/302, 152; 360/10, 35, 37

[56] References Cited

U.S. PATENT DOCUMENTS

| | | | |
|---|---|---|---|
| 2,517,797 | 8/1950 | McFarlane | 358/214 |
| 2,681,383 | 6/1954 | Loe | 358/152 |
| 2,816,157 | 12/1957 | Andreas et al. | 358/131 |
| 3,352,468 | 11/1967 | Walter | 360/35 |
| 3,535,446 | 10/1970 | Hilborn | 358/152 |
| 3,571,503 | 3/1971 | McMann | 358/130 |
| 3,634,623 | 1/1972 | McMann | 358/152 |
| 3,716,670 | 2/1973 | Lowry | 358/130 |
| 3,786,182 | 1/1974 | Kaneko et al. | 358/244 |

FOREIGN PATENT DOCUMENTS 1,146,100   3/1963   Germany ............................ 360/35

Primary Examiner—Raymond F. Cardillo, Jr.
Attorney, Agent, or Firm—Ralph G. Hohenfeldt

[57] ABSTRACT

Raster lines are obscured in a photograph of an image displayed on a video monitor. A photographic film is used as an integrating mechanism. The TV raster is vertically displaced during the camera shutter open time a total deflection of one horizontal line, thus blending the information between horizontal lines. Vertical raster deflection is accomplished by adding a series of delays to the normal vertical sync and then generating a processed composite sync to drive the external sync input to the monitor. The shutter is open for several video frames, each frame being deflected vertically by an integer amount greater than the previous frame until the total raster deflection equals one horizontal line.

13 Claims, 4 Drawing Figures

METHOD AND APPARATUS FOR OBSCURING THE RASTER LINES IN A PHOTOGRAPH OF A VIDEO MONITOR SCREEN

BACKGROUND OF THE INVENTION

This invention pertains to a method and apparatus for minimizing visual perception of the raster lines on a photographic film recording of a video or TV monitor picture.

As is well known, when a viewer is near a video monitor, the horizontal scan lines can be seen on the face of the picture tube. If the viewer stays far enough away from the tube, however, the horizontal lines can no longer be resolved by the eyes and the picture appears rather uniform instead of appearing to be composed of a multiplicity of horizontal lines.

The present invention is especially concerned with obscuring the horizontal raster lines in a photograph of a picture taken of the screen of a video monitor tube when a static video picture is being displayed. An example of photographically recording static pictures on a video monitor tube arises in the medical field where video monitors are used to display converted x-ray images. In x-ray diagnostic systems, an x-ray image is converted to an optical image with an image intensifier and the optical image is viewed with a video camera. The resulting video signals may be stored in the video recorder and the signals from the recorder may be used to drive a video monitor. A camera is directed toward the picture tube face plate to enable photographic recording of any static image that is derived from the recorder and displayed on the monitor. Of course, when a conventional video system is used, the scan raster lines are also recorded on the film with such good definition as to be very distracting to anyone studying the photograph for detailed information.

One method that has been proposed for reducing visualization of the raster lines is to oscillate the scanning beam over the vertical distance of one pair of scan lines as the scanning beam progresses horizontally across the picture tube. This requires applying a high frequency signal to the scanning coil or electrodes of the video display tube such that the space ordinarily occurring between the scan lines appears to be filled and, accordingly, perception of the lines is reduced. However, this prior method has substantial technical and economic problems associated with it. It is not easy to control beam dithering with such precision as to avoid loss of picture information. This approach also increases the losses in the magnetic deflection coil and it wastes electric power.

SUMMARY OF THE INVENTION

A general object of the present invention is to provide a new method and new apparatus for producing a video display in which the raster scan lines are obscured or, in a sense, erased in a photographic film of the display. Another object is to improve the quality of photographs taken from video picture tubes.

A more specific object is to shift the whole raster downwardly in repeatable numbers of increments by integer amounts over a total distance equal to one pair of horizontal lines such that the picture information from adjacent lines blends into the space between them during a photographic exposure interval.

In an illustrative embodiment of the invention, the video or TV camera signals including the picture information and horizontal and vertical sync pulses are recorded on a video disc recorder or other suitable video signal recorder. The signals for a recorded scene are supplied to a closed circuit video monitor which displays a static view of the scene. The external sync terminals of the monitor are used. The picture tube is optically coupled with a camera. The camera shutter is operated electrically, such as with a relay, and the camera film transport mechanism is electrically driven. Means are provided to open the camera shutter at a predetermined time after which a static field is seen by the camera. Each successive video field or raster is then shifted downwardly by an integer amount over the total distance between one pair of lines and the shutter is closed.

The number of increments through which the raster is shifted during an exposure and the time at which a shift is made is determined by a field or frame counter that is controlled by vertical sync pulses. Means are provided for separating the vertical sync pulse signals from the original composite video signals and, after further processing, the vertical signals are used to open the camera shutter to begin a film exposure with the next ensuing video field. Each successive vertical sync pulse corresponding with a raster shift step is delayed by an integer amount before it is fed into the external sync pulse terminals of the video monitor so the raster shifts vertically on the screen of the tube and the photographic film integrates the shift for a sufficient number of video frames for the complete series of 16 steps to occur in this example.

The new method and means for shifting the raster on a video monitor will be illustrated herein in connection with an x-ray diagnostic system but it should be understood that the invention is applicable to any system wherein it is desired to obscure the raster lines on a video monitor for photographic recording of a static scene.

How the foregoing and other more specific objects of the invention are achieved will appear in the course of the description of an illustrative embodiment of the invention which will now be set forth in reference to the drawings.

DESCRIPTION OF A PREFERRED EMBODIMENT

Figure 1:
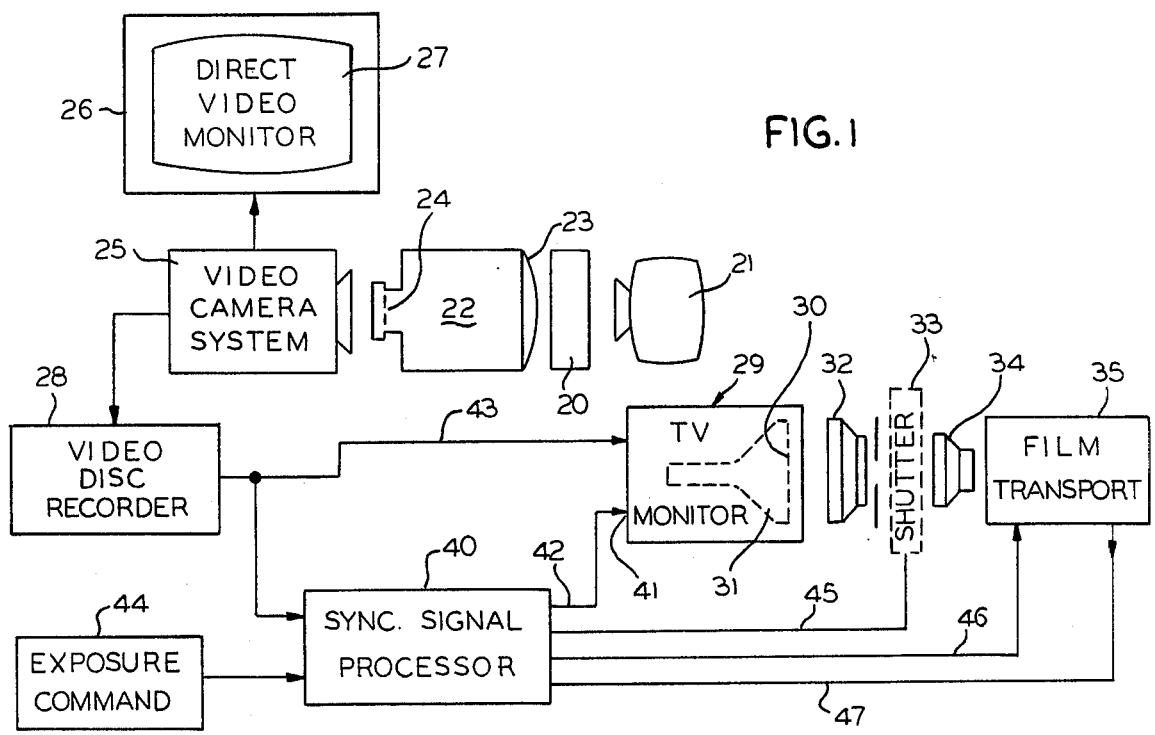
FIG. 1 is a block diagram of a system for illustrating the new TV line obscuring or raster scan shift means.

Refer to the FIG. 1 block diagram where the new system for obscuring or erasing scan lines on a TV picture tube by means of raster shift is illustrated as being used in a diagnostic x-ray system.

The x-ray portion of the system is ancillary to the TV line erasure and photographic exposure control portions and is set forth for background purposes. In this Figure an object to be radiographed, such as the human body, is identified by the reference numeral 20. On one side of the body is an x-ray tube 21 and on the other side is an x-ray image intensifier 22 whose input end 23 receives the x-ray image. The x-ray image is converted to an optical image which appears on a phosphorescent screen 24. A video camera 25 is directed toward the screen and is optically coupled thereto. The video camera 25 supplies a video monitor 26 which permits the examining radiologist to view the image of the anatomy of patient 20 on the monitor screen 27 in real time.

In some medical x-ray procedures, it is desirable to be able to recall one or more x-ray images from a sequence of images and to be able to make a permanent photographic recording of an image. The present invention is particularly useful in systems for practicing such procedures.

To enable photographic recordings, the system shown in FIG. 1 is provided with a video disc recorder 28. When the radiologist sees a scene for which he desires a hard photographic copy, he takes measures in the system to supply the video signals from camera system 25 to video disc recorder 28 so that recorded scenes will be available for photographic recording.

A separate closed circuit video monitor 29 is provided for displaying selected recorded images on the screen 30 of a television picture tube 31. In front of the screen 30 in a light tight enclosure which is not shown are the elements of a photographic camera including a lens assembly 32, and electrically driven shutter 33, another lens 34 and the film transport mechanism which is symbolized by the block 35. In prior systems, a static video recorded scene or image would be made to appear on the screen 30 of the tube at least as long as is required to obtain an adequate exposure with the camera system. When conventional monitors are used in such a system, of course, the raster lines are clearly visible on the photograph.

In accordance with the illustrated embodiment of the invention, the raster is shifted vertically during a film exposure by the amount of one raster line. A sync signal processor 40, to be explained in detail later, participates in achieving these objectives. The processed sync signals are supplied to the external sync input terminals 41 of a video monitor 29 over an output line in 42 which is supplied from the signal processor 40. The composite video output signal, including the video signal and the vertical and horizontal sync timing pulses, is furnished from the video disc recorder to the monitor 29 by means of a line 43. When the operator activates an exposure command in the circuit that is symbolized by the block 44, the same video field appears repeatedly on monitor 29 for a sufficient length of time to enable proper photographic exposure and to enable shifting the raster at frame rate in increments over the distance of one line while the film serves as an integrator. Initiation of an exposure command results in an opening command signal being supplied to the camera shutter system over a line 45. When exposure is complete, another command is given to close the shutter and this is followed by a command over line 46 that results in the film being transported. A signal that is sent back from the film transport over line 47 indicates to the signal processor 40 that film transport is complete and that this one condition is met before making another photograph.

Figure 2:
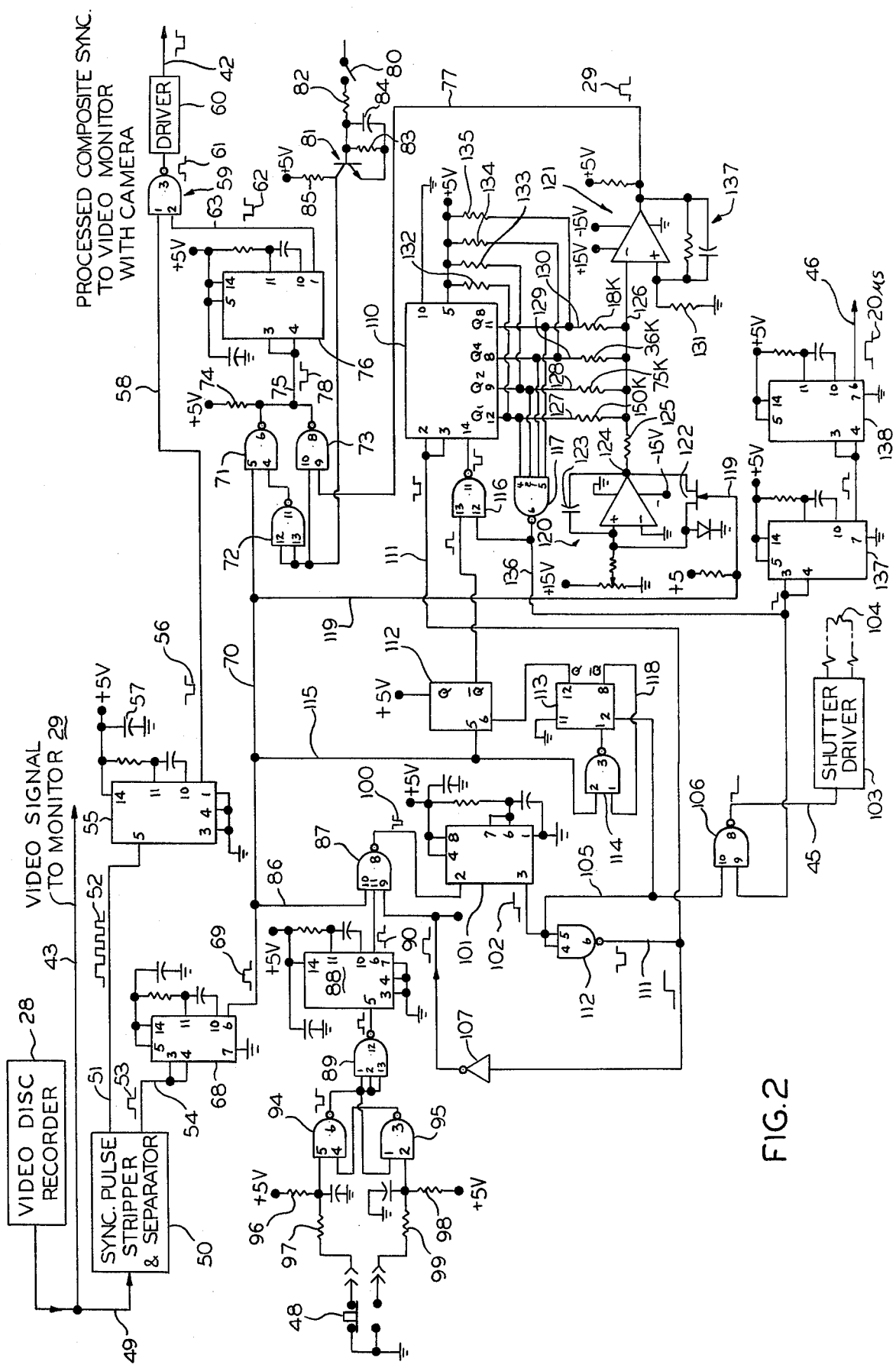
FIG. 2 is a more detailed circuit diagram of one system for processing video signals to effectuate line erasure or line obscuring with raster shift and for obtaining photographic exposure control.

Refer now to FIG. 2 for a description of an illustrative electronic circuit which enables the closed circuit TV monitor to be operated in a conventional mode with the raster lines visible or, selectively, in the raster shift mode with the raster lines obscured. Video disc recorder 28 is shown in the upper left. A portion of the cable 43 for conducting signals from the video disc recorder 28 to the input terminals of the monitor 29 which is used in the photographic recording system is also shown. In the upper right of this Figure, the line 42 for delivering the sync signals to the external sync signal input terminals 41 of monitor 29 is also shown. At the left is a push button 48 which only needs to be pressed momentarily for the entire sequence of events including camera shutter opening, incremental raster shift, closing of the shutter and film transport to take place automatically.

In FIG. 2, video signals from the video disc recorder 28 are conducted by means of a line 49 to a sync pulse stripper and separator 50 which may be conventional and need not be described. The stripper is active during either the conventional or raster shift modes. Its purpose is to strip the sync pulses from the composite video signal. In this case, the series of horizontal and vertical sync pulses appear on an output line 51 of the stripper. This group of pulses is illustrated by the waveform 52 adjacent line 51. Vertical sync pulses such as the one marked 53 appear on output line 54. All of the timing events in the processor circuit and including shutter opening and closing are referenced to a vertical sync pulse. In accordance with the present invention, the vertical sync pulses associated with a sequence of static TV fields that are to be photographed are successively delayed by integer amounts so that the vertical sweep oscillator in the monitor 29 is triggered later for each field, thus causing vertical raster shift at frame rate.

The repetition rate of the vertical and horizontal pulses, of course, depends on the scan rate of the video system being employed. The invention is described herein in reference to a video system having line rates of 525/60 Hz and which have 2:1 interlace. Those skilled in the art will appreciate, however, that the principles set forth will enable those skilled in the art to adapt the invention for TV line rates of 625/50 Hz, 875/60 Hz, and 1023/50 Hz and other line rates. It will also work equally as well in non-interlaced systems.

In FIG. 2, the composite vertical and horizontal pulse train 52 is supplied over line 51 to input pin 5 of a monostable multivibrator 55 which converts each positive going incoming sync pulse to a negative going output pulse that appears on output pin 1 of multivibrator 55. One of the output pulses is marked 56 and, in this particular case, has a 5 microsecond duration. These pulses are developed at the rate of the incoming horizontal and vertical pulse train 52. Monostable multivibrator 55 is typically a transistor-transistor logic type 74121. Its timing resistor and capacitor are connected as shown to pins 14, 11 and 10 and to a 5 volt supply as shown in accordance with the manufacturer's data sheet. This monostable multivibrator and other transistor-transistor logic devices in the circuit are usually provided with a despiking capacitor which is marked 57 in association with multivibrator 55. Despiking capacitors are associated with several of the logic devices shown in the circuit but they will not be given reference numerals nor discussed specifically hereinafter. Despiking capacitors are commonly used to filter noise spikes and other signal artifacts.

The horizontal pulse train from pin 1 of multivibrator 55 is delivered by means of a line 58 to input pin 1 of a NAND gate 59. Output pin 3 of NAND gate 59 supplies a driver circuit 60 which raises the energy level of the horizontal and vertical sync pulses before they are delivered over line 42 to the external sync input terminal 41 of monitor 29. The horizontal sync pulses are not otherwise processed whether or not the raster shift mode of operation has been selected. The other input pin 2 of gate 59 is supplied with a sequence of vertical sync pulses via line 63 which are successively delayed if the raster shift mode has been selected, so as to bring about raster shift equal to one scan line. If the raster shift or line erase mode is not selected, the vertical sync pulses are not delayed but will be fed through line 63 in normal fashion as will be explained. For the moment, it is only necessary to be aware that when both inputs of NAND gate 59 are high or in logical state 1 its output is low or in logical state 0 so one or the other of horizontal and vertical sync pulses will be gated through. Thus, between vertical sync pulses, pin 2 of NAND gate 59 is high so incoming low going horizontal sync pulses 56 will be gated through to produce a corresponding series of high going output pulses 61 on output 3 of the gate. When successively delayed negative going vertical sync pulses 62 of about 100 microseconds duration are fed into pin 2 of gate 59, these pulses are gated through such that output 3 of the gate goes high repeatedly. In this example, during raster shift mode, based on a 525/60 Hz scan rate, each vertical sync pulse rise is delayed by 4 microseconds as compared with a preceding pulse and there are 16 delayed pulses or steps to effect shift to the extent of one raster line.

Consideration will now be given to how the vertical sync pulses are processed for normal and raster shift modes. The vertical sync pulses come out of stripper 50 as positive going pulses 53 which are fed over a line 54 to input pins 3 and 4 of a monostable multivibrator 68 which may be 5 volt transistor-transistor logic type 74121, for example. This multivibrator has its RC timing circuit connected to pins 14, 11 and 10 and its supply voltage applied to pins 5 and 14. It also has the customary despiking capacitor between the supply line and ground. In this example, incoming vertical sync pulses 53 trigger the multivibrator 68 to produce corresponding vertical sync pulses 69 which appear on its output pin 6. The vertical sync pulses 69 in this case are positive going and endure for 2.3 ms or 2300 microseconds. In a 525 line/60 Hz TV line rate system, of course, vertical pulses occur 60 times per second or every 16.66 ms.

In the circuit of FIG. 2, the vertical raster shift feature may be disabled if desired so that the horizontal scan lines are not blended on the monitor face as is the case in conventional TV monitors. Thus, the vertical sync pulses 69 may be delivered directly without being successively delayed, to one input of NAND gate 59 where they may be combined with the horizontal sync pulses coming in on pin 1 of this gate and used to drive the monitor 29 in the ordinary fashion. In this mode of operation, the vertical sync pulses 69 are delivered over a line 70 to a group of NAND gates 71, 72 and 73. When vertical raster shift is disabled, input pin 4 of NAND gate 71 is held high or at logic one in which case incoming vertical pulses to pin 5 of NAND gate 71 appear on output pin 6 as negative going or inverted pulses because current from the 5 volt supply passing through a resistor 74 is sinked in output pin 6. These low going edge sync pulses are delivered by means of line 75 to input pins 3 and 4 of a monostable multivibrator 76 which may also be a type 74121. Each time there is a low going input pulse to pins 3 and 4, a low going output pulse such as 62 occurs on output pin 1 of the multivibrator 76. These pulses correspond in starting time with the ordinary vertical sync pulses and they are combined and gated through gate 59 with the horizontal pulses to trigger sweep of the electron beam in the monitor tube in the ordinary fashion. As stated earlier, in this 60 Hz system, vertical sync pulses 62 may have a duration of about 100 microseconds.

When the system has been switched to the vertical raster shift mode, input pin 4 of gate 71 is held low or logic 0 so that undelayed incoming positive vertical sync pulses will not be gated through gate 71. However, processed or successively delayed vertical sync pulses which are then coming in over line 77 to input pin 9 of gate 73 will be gated through to input pins 3 and 4 of multivibrator 76 and there will be corresponding delayed pulses 62 from output pin 1 of this multivibrator.

The system is enabled to operate in the raster shift mode by opening a switch 80 at the right of the diagram so as to remove the bias from the base of a transistor 81 which has a base resistor 82, a biasing resistor 83 and by-pass capacitor 84. It also has a collector resistor 85 which connects to the 5 volts supply. When switch 80 is open, the collector 85 of transistor 81, which connects to the 5 volt supply, goes high or to a positive logic 1. This high signal is supplied to input pins 12 and 13 of NAND gate 72 so its output pin 11 is held low. Thus, with pin 4 of gate 71 low, incoming unprocessed vertical sync pulses to pin 5 will not be gated through. However, if pin 10 of NAND gate 73 is high, incoming positive going processed and delayed vertical sync pulses applied to pin 9 will be gated through and inverted each time a processed vertical sync pulse occurs. As explained earlier, this will trigger multivibrator 76 at successively delayed times so that vertical pulses will be gated through NAND gate 59 with corresponding delays in triggering the vertical oscillator monitor 29.

Assume now that the vertical raster shift and vertical sync pulse delay feature is activated by having switch 80 opened. The vertical sync pulses 69 from multivibrator 68 adjacent the pulse stripper having a 2.3 ms duration and occurring at a rate of 1 every 16.66 ms are then delivered from multivibrator 68 over a line 86 to input pin 10 of a NAND gate 87 in a field synchronizing and exposure control circuit. The NAND gate 87 will only produce a corresponding negative going output pulse on its output pin 8 when all of its input pins 9, 10 and 11 are high simultaneously. Input pin 9 of gate 87 goes from logic 0 to 1 when all conditions are ready for an exposure, that is, when by extraneous means a signal is provided to pin 9 indicating that certain conditions have been met such as film is in the camera, the dark slide of the camera has been removed and so forth. Pin 11 of gate 87 is caused to go high to enable the gate to pass vertical sync pulses in response to manually operated push button 48 being actuated. This occurs when the operator desires to initiate an exposure.

Input pin 11 of NAND gate 87 goes high when output pin 6 of an adjacent type 74121 monostable multivibrator 88 goes high. Output pin 6 of the multivibrator 88 goes high when its input pin 5 goes high due to being triggered by the high going edge of an exposure command output pulse on pin 12 of a NAND gate 89. Multivibrator 88 has the usual RC timing circuit connected to its pins 10, 11 and 14 and has a despiking capacitor and the 5 volt positive supply connected to its pin 14.

When all input pins 1, 2 and 13 of gate 89 are low its output pin 12 goes high and monostable multivibrator 88 is triggered to produce a positive going output pulse 90 having 16 to 20 ms duration. The duration of this pulse is at least as great the interval between normal vertical sync pulses 69 coming in to input pin 10 of gate 87. Thus, one or the next successive incoming vertical sync pulse occurring every 16.66 ms is sure to occur during the near 20 ms interval of pulse 90 which appears on input 10, 11 of gate 87. This is important to establishing proper timing of other events that occur in the circuitry.

As indicated, an exposure is initiated by depressing push button switch 48. It is in a circuit with a pair of cross-connected NAND gates 94 and 95 which act as a latch. When push button switch 48 is in the position in which it is shown in FIG. 2, positive supply voltage is connected to ground through resistors 96 and 97 and input pin 5 to gate 94 is low or at logic zero. This means that its output pin 6 is normally high or at logic 1. This logic 1 also appears on input pin 1 of NAND gate 89, making its output pin 12 normally low. Pin 2 of latch gate 95 is also normally high by reason of it being connected to 5 volt supply to a resistor 98. When push button switch 48 is depressed, pin 2 of gate 95 is connected to ground through resistor 99 and this resets the latch so that pin 6 of gate 94 goes low or to logic zero and this short duration pulse is connected to gate 89 to trigger monostable multivibrator 88. As stated, output pin 6 of multivibrator 88 then goes high for about 20 ms and any incoming vertical pulse to pin 10 of NAND gate 87 causes its output pin to go low or to logic zero to initiate a timing sequence that is referenced to a specific vertical pulse.

The first low going pulse 100 that is intercepted in correspondence with a vertical sync pulse is delivered to input pin 2 of a timer 101 which may be 5 volt transistor-transistor logic type 555. It has the usual RC timing circuit connected to its input pins 1, 6, 7, 8 and 4 and a despiking capacitor connected to pins 4 and 8 and the positive supply. The output from pin 3 of this timer is inverted in an inverter 107 and connected to pin 9 of gate 87 to defeat it during the rest of the sequence.

Incoming pulse 100 triggers timer 101 to produce a logic 1 output pulse 102, or exposure trigger pulse as it is called, which preferably endures long enough for several events to take place in the circuitry such as opening of the camera shutter exposure for 16 fields, closure and transport of the film. An exposure trigger pulse 102 of one second duration was used in an actual embodiment of the invention. The latch comprising gates 94 and 95, gates 87 and 89, multivibrator 88 and timer 101 may be characterized as a field synchronizer and exposure control circuit of the system.

The relatively long exposure control or exposure enable pulse 102 is used among other things to open the shutter 23 of the monitor camera. The circuitry is such that there wll be no vertical shifting of the monitor raster during the shutter opening interval nor will the raster shift until the circuit is in condition for counting the successive TV fields or frames. This process will be explained shortly hereinafter. The driver for the camera shutter is symbolized by a block marked 103. The camera shutter drive 103 may be any conventional circuit for increasing the driving power level to the relay 104 which actuates the shutter. The command signal for operating the shutter is fed to the driver 103 through a conductor 45 which is shown in FIG. 2 and is similarly marked in FIG. 1. The shutter open command signal is coincident with the leading edge of exposure trigger or enable pulse 102. This pulse is fed through a conductor 104 to input pin 10 of a NAND gate 106. Pin 9 of NAND gate 106 is normally high or at logic 1 when an exposure is initiated. Thus, both pins 9 and 10 of gate 106 are high when exposure trigger pulse 102 is delivered to pin 10 and output pin 8 goes low and remains low for the duration of pulse 102 and a corresponding signal on line 136, thus keeping the shutter relay 104 energized and the shutter opened for the duration of an exposure. The camera shutter remains opened long enough for the raster to be shifted by integer amounts over the distance of at least one raster line as mentioned earlier.

The manner in which a vertical sync pulse is used to synchronize shutter opening and other events in the system and the manner in which successive sync pulses are delayed to effectuate vertical raster shift will now be described.

A subsystem which may be called a delay pulse generator comprising a binary counter 110, NAND gate 117, integrator 120 and a comparator 121 is involved in successively delaying vertical sync pulses for raster shifts. Counter 110 counts TV frames and may be a 5 volt transistor-transistor logic type 7493. This counter is enabled, although it may not yet begin counting, when the low going edge of an input exposure trigger pulse is supplied to its enabling pins 2 and 3 as shown. This pulse is supplied over line 111 from the output pin 6 of a NAND gate 112 which inverts the relatively long duration exposure trigger pulse 102 which is applied to enabling pins 2 and 3. The counter 110 counts undelayed vertical sync pulses which are applied to its clock signal input pin 14.

The vertical sync or clock pulses are processed in a field delay circuit which is in one sense a vertical sync pulse selecting means comprised of flip-flops 112 and 113 and a NAND gate 114. Flip-flops 112 and 113 function as a divide-by-2 counter in this embodiment where fields are shifted at frame rate. The field delay circuit is for the purpose of assuring that the camera shutter will be open before counting of the successive fields that result in raster shift begins. Flip-flops 112 and 113 are connected so that flip-flop 113 will count one vertical sync pulse and become disabled and flip-flop 112 will go on dividing vertical sync pulses by 2. When flip-flop 113 is disabled, flip-flop 112 is enabled and delivers a sequence of negative going pulses from its $\bar{Q}$ output in coincidence with alternate incoming vertical sync pulses which are delivered from the sync pulse separator 50 over line 115.

When one-second duration exposure trigger pulse 102 is delivered over line 105 to the reset pin 2 of flip-flop 113, $\bar{Q}$ pin 8 of flip-flop 113 is in a logic 1 state. This logic 1 signal is applied via line 118 to input pin 1 of NAND gate 114 which at this time has an incoming high or logic 1 signal corresponding with the first vertical sync pulse applied to its input pin 2. Thus, output pin 3 of gate 114 goes low to clock flip-flop 113 and make its output pin 12 high. The leading edge of this high going signal is applied to the reset pin 6 of flip-flop 112, thus enabling it. Up to this point, the flip-flop 112, being disabled, has not counted the first vertical sync pulse. It does, however, count ensuing vertical sync pulses and produces corresponding output pulses on its $\bar{Q}$ output pin. After flip-flop 113 has counted the first vertical sync pulse, it remains disabled. Flip-flops 112 and 113 may be transistor-transistor logic type 7473 in the same package and supplied from a common DC source.

A positive going output pulse is produced by flip-flop 112 every other time an input vertical pulse to its pin 5 goes low. The output pulses from flip-flop 112 are fed to input pin 13 of a NAND gate 116 whose other input pin 12 is held high until the frame, consisting of 16 fields or frames in this example, has been counted. NAND gate 116 inverts the incoming clock or sync pulses and delivers them to clock input pin 14 of binary weighted output counter 110. Counter 110 is now enabled and in condition for counting successive vertical sync pulses. In this particular case, where the raster is shifted one line in 16 steps input pin 12 of gate 116 will go low at the end of 16 steps and counting will terminate.

Counter 110 has weighted outputs. That is, its output pins 12, 9, 8 and 11 are, respectively, accorded the binary weights of 1, 2, 4 and 8. In effect, the outputs are in binary coded form. When the outputs of the counter are all high, that is, at binary 1111, all of the inputs to a NAND gate 117 are high and its output pin 16 is low. This makes input pin 12 of gate 116 low so as to disable this gate and terminate counting of vertical sync pulses. Raster shift over the distance between raster lines is complete at this point.

Resistors 132-135 which are connected between the 5 volt supply and the respective output pins 12, 9, 8 and 11 of the counter are simply pull-up resistors which are commonly required with transistor-transistor logic devices as is known to skilled electronic designers.

Counter 110 cooperates with an integrator 120 and a comparator 121. Consider integrator 120 first. It has a field effect transistor 122 connected between its noninverting input terminal and its output terminal in parallel with integrating capacitor 123. The gate of field effect transistor 122 is supplied with vertical sync pulses over a line 119. Integrating capacitor 123 is normally short-circuited by field effect transistor 122. Each time a vertical sync pulse comes in, however, the field effect transistor 122 is turned off and integration occurs. This results in an identical negative going ramp signal being produced on the output terminal 124 of the integrator for every incoming vertical sync pulse. The output of integrator 120 has a resistor 125 in series with it and one end of this resistor is connected to a common line 126 which, in turn, connects to the inverting terminal of comparator 121 which may comprise an operational amplifier, type LM311.

Divider resistors 127-130 are connected between the outputs Q1, Q2, Q4 and Q8, respectively, of counter 110 and common line 126. As a result, an identical voltage is developed on common line 126 at successively later times during the negative ramp for each step of the counter. The voltage is produced with a successively longer delay for each sync pulse that triggers the integrator. When all outputs of the counter 110 are zero, as they are right after the counter is enabled, the comparator 121 is quiescent. For example, when the first count occurs, Q1 is high and the other outputs are low so that binary 0001 constitutes the counter output. This results in a voltage being supplied to the top of divider resistor 127 and current flows through resistor 125 such that a voltage sufficient to trigger the comparator 121 is produced at the beginning of the first negative going ramp that is generated by the integrator. When the second ramp is generated, the output of counter 110 has switched so that only Q2 is high and the output is 0010 or weighted 2. Thus, a voltage sufficient to trigger comparator 121 will now appear on common line 126 at a time when the negative going ramp is just a little more negative than it was when the same voltage appeared after occurrence of the first sync pulse in the sequence that is being counted. Those skilled in the art will be able to continue with the process and observe how the voltage for triggering comparator 121 will occur at later and later times over the negative ramp interval as the count of counter 110 proceeds to 16 or binary 1111. Typical values of resistors 125 and 127-30 are given next to these resistors to permit calculation of the voltages as a percentage of the ramp voltage if desired. In any event, when a count of 16 has been reached in this example, the raster shift of 16 integer amounts has been completed in which case, as mentioned earlier, all inputs to NAND gate 117 are high and its output goes low to disable gate 116 and terminate counting.

Each time one of the sequence of identical voltages appears on common line 126, which is the inverting input terminal of comparator 121, the reference voltage of the comparator is exceeded and the comparator switches and provides the successively delayed vertical sync pulses to line 77. The reference voltage is established with resistor 131 and its associated network 137. Network 137 provides hysteresis for preventing switching ambiguities that may result from operating a comparator with a ramp input. As was explained earlier, the output pulses from comparator 121 are gated through NAND gate 73 to trigger monostable multivibrator 76. The corresponding pulse output of multivibrator 76 then delivers the vertical sync pulses for each successive field to NAND gate 59 which also gates the horizontal pulses to the driver that controls the triggering of the vertical oscillator in the video monitor 29.

When the raster has been shifted in steps over the distance between lines, it is time to terminate the exposure. As mentioned, at this time all inputs to NAND gate 117 are high so output pin 6 of gate 117 goes low and this low signal is applied, by means of line 136 to the input pin 9 and NAND gate 106, thus making one of its input low and its output pin 8 high. This changing signal is coupled to shutter driver 103 to deenergize shutter relay 104 and close the camera shutter. The pulse signal on line 136 that is used for closing the camera shutter is also used to effect a film transport command so that another film will be in place for the next exposure. The film transport command in this particular design has to persist for a relatively long time so two monostable multivibrators 137 and 138 are connected in cascade. At the end of an exposure interval, that is, after the end of the raster shift sequence, a negative going pulse is applied from output pin 6 of NAND gate 117 to input pins 3 and 4 of multivibrator 137. This produces an output pulse of approximately 20 ms on output pin 6 of this multivibrator. This pulse is applied to input pins 3 and 4 of multivibrator 138 and, on it output pin 6, a 20 ms film transport command signal is produced. As shown, this command signal is delivered over a line 46 in FIG. 2 to the film transport assembly 35 which is shown symbolically in FIG. 1. By means which are not shown, a signal is returned from the film transport indicating that transport is complete. This is one of the conditions for enabling input pin 9 of NAND gate 87 in the exposure control circuit at the left so that the next exposure may be made when manual push button 48 is depressed.

Figure 3:
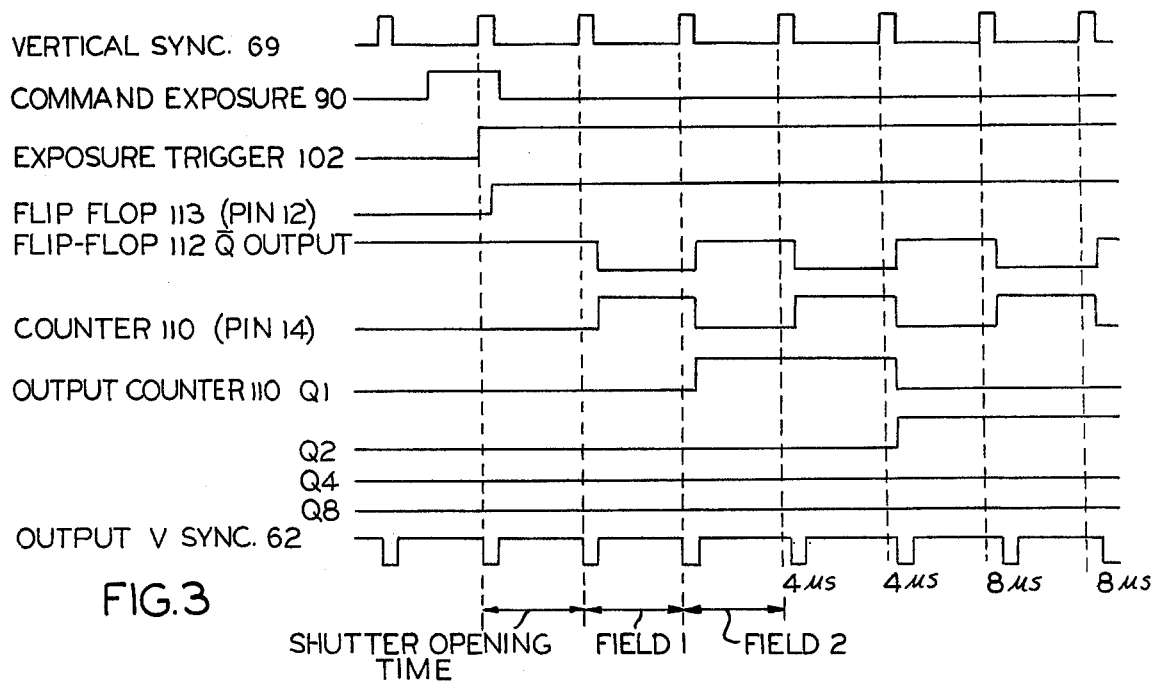
FIG. 3 is a set of waveforms which facilitate review of some of the signal time relationships existing in the illustrative embodiment.
Figure 4:
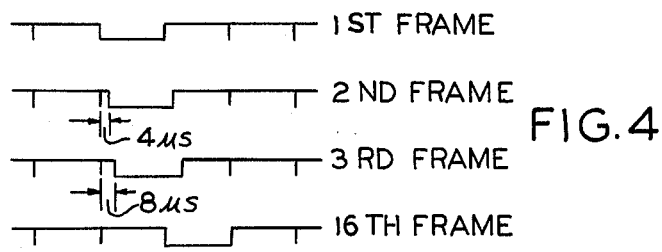
FIG. 4 illustrates some of the series of sync pulse waveforms which are supplied to the monitor when the system is operating in the raster shift or line erase mode.

The operating mode of the system which has heretofore been described in a detailed manner in reference to FIG. 2 will now be recapitulated in a more generalized manner for the raster shift mode in reference to FIGS. 3 and 4.

In FIG. 3 the normal undelayed train of regularly occurring sync pulses 69 is shown as the uppermost waveform. These are obtained from multivibrator 68 following the stripper. The next waveform is the exposure command signal 90 caused by manual operation of switch 48. Signal 90 occurs on the output of multivibrator 88 and goes low to high as shown. The exposure command signal is high when a vertical sync pulse occurs and this triggers timer 101 so its output pin goes high coincident with occurrence of a reference sync pulse 69 and this is represented in FIG. 3 by exposure trigger signal 102 which endures for one second which is longer than it takes to present 16 TV frames. As previously stated, one use made of exposure trigger signal 102 is to defeat NAND gate 87 during the rest of the exposure interval.

The beginning of exposure trigger signal 102 causes output pin 12 of flip-flop 113 to go high as shown by the fourth waveform and this enables flip-flop 112 to begin dividing numbers of vertical sync pulses by two.

The sixth waveform is the input to pin 14 of counter 110 and this clock pulse signal is actually in time with the $\bar{Q}$ output of flip-flop 112 except that the signal is inverted by NAND gate 116.

When the third vertical sync pulse 69 goes low, after exposure trigger signal 102 occurs, the $Q_1$ output of counter 110 is high and stays high for two vertical sync pulses. Note, however, that when exposure trigger signal 102 occurs, three coincident vertical sync pulses 69 are not delayed as evidenced by the corresponding output sync pulse in the lowermost waveform 62. The lack of a delay is due to the divide-by-two flip-flop 112 being inhibited by the action of flip-flop 113 and gate 114. Thus, flip-flop 113 delays raster shift for a period of 16.6 milliseconds until the camera shutter has time to open, then there is no raster shift for two fields that are exposed. When $Q_1$ of counter 110 goes high, the negative going ramp signal is being produced by integrator 120 and the first delayed sync pulse 29 corresponding with a delayed sync pulse 62 is produced coincident with switching of comparator 121 as was explained earlier.

After the two consecutive fields constituting the first frame have been delayed or shifted, flip-flop 112 recycles and the sequence of events is repeated with the $Q_2$ output of counter 110 going high next. This causes a different voltage to be summed with the ramp signal and causes comparator 121 to switch and produce the next two delayed sync pulses about 4 microseconds later relative to the incoming sync pulses. This process is repeated with various combinations of $Q_1$, $Q_2$, $Q_4$ and $Q_8$ of the counter 110 going high so as to shift the third to sixteenth frames by additional four microsecond increments. After the sixteenth frame, counter 110 resets, the camera shutter closes and the film is transported.

FIG. 4 shows the waveform of the horizontal sync pulses and the delayed vertical sync pulses on the output of NAND gate 59 from which these pulse trains are delivered through driver 60 to the external sync input terminal of the monitor. The combined sync pulse trains for the first, second and third and the sixteenth frames are illustrated. Note that the vertical sync pulses 62 are successively and increasingly delayed by 4 microseconds but that the phase of the horizontal short duration sync pulses is unchanged.

In summary, illustrative circuitry for shifting the raster of a video monitor by integer amounts equal in the time and space domains to one raster line pair so that the lines blend and become obscure on the photographic film. This is achieved by delaying each vertical pulse in the sequence of vertical pulses corresponding with the number of shifting steps. The arrangement described vertically shifts each pair of fields or, in effect, each frame by an integer amount. This is suitable in the present example because the same field representing a static video scene is repeatedly presented on the monitor screen. Thus, fields are presented at the frame rate by virtue of flip-flops 112 and 113 being connected to function as a divide-by-two counter. In video systems wherein it is desired to present non-interlaced fields and frames, the divide-by-two feature can be removed. It will still be necessary, however, to inhibit counting of the fields a sufficient time after the first or reference vertical sync pulse has occurred to allow the camera shutter to open.

The illustrative raster shift scheme has been implemented herein with transistor-transistor logic devices and discrete logic elements. Those skilled in the art will recognize, however, that the system may be implemented in other ways such as with a combination of logic devices suitably programmed to perform the timing functions and properly sequence the events. Accordingly, the true scope of the invention is to be determined only by construing the claims which follow.

We claim:

1. A method of vertically shifting a television monitor picture tube raster by a total amount substantially equal to the distance between a pair of horizontal scan lines where said raster is produced by scanning an electron beam horizontally in response to occurrence of horizontal sync pulses and vertically in response to occurrence of vertical sync pulses and wherein video information signals for modulating said beam to produce picture information for a static picture are obtained from a composite video waveform which includes horizontal and vertical sync pulses, said method comprising the steps of:

separating horizontal and vertical sync pulses from said composite waveform, supplying signals corresponding with said horizontal sync pulses for each field to said monitor in the time relationship in which said horizontal pulses normally occur in said composite waveform to thereby effect horizontal deflections of said beam for each field, generating a predetermined number of signals corresponding with said vertical sync pulses which generated signals are increasingly delayed relative to the sync pulses in the composite signal with which they correspond, and using said delayed vertical signals to control the vertical positions of successive rasters in place of said vertical sync pulses in said composite signal.

2. For use with a video monitoring system having input means for receiving a composite signal that includes vertical sync pulses for initiating vertical deflection, horizontal sync pulses for initiating horizontal deflection and picture information signals and a display tube controllable by successive vertical sync pulses to produce successive fields comprised of vertically spaced apart horizontal lines that are intensity modulated by said picture information signals, the improvement which results in a first field in a sequence of fields being displayed and a predetermined number of succeeding fields being displayed whose horizontal lines are shifted vertically by uniformly increased amount relative to said first field and the shifting process is terminated at least before the horizontal lines in the last field in said predetermined number become coincident with the horizontal lines in said first field to thereby reduce visualization of space between the horizontal lines in the fields, said improvement comprising:

means for producing vertical sync pulses corresponding with the uniformly timed vertical sync pulses in said composite signal which are normally used to initiate vertical deflection in said display tube for each field, means responsive to occurrence of a sequence containing a predetermined number of said vertical sync pulses by producing a vertical sync signal for each of said predetermined number of vertical sync pulses where the produced signals are successively and uniformly increasingly delayed relative to the sync pulses with which they correspond, and means for controlling said display tube in response to the horizontal sync pulses in said composite signal for each field and in response to successive delayed vertical sync signals for each field, said fields being shifted vertically by an amount corresponding with the amount by which their vertical sync signals are delayed.

3. Means for vertically shifting a predetermined number of fields representing a picture on the display tube of a television monitor to obscure the horizontal lines ordinarily visible on the face of the display tube in a photographic film that has been exposed to a sequence of said television fields, said means comprising:

sync pulse stripper and separator means responsive to being supplied with a composite video waveform by producing uniformly timed trains of horizontal and vertical sync pulses corresponding with the sync pulses of said waveform, means for using said horizontal sync pulse trains for each field to control production of said fields correspondingly with occurrence of said horizontal sync pulses in said composite waveform, means responding to occurrence of a sequence of vertical sync pulses in said waveform by producing a corresponding sequence of vertical sync signals that are equal in number to the number of shifts desired and are respectively increasingly delayed relative to the vertical sync pulses with which they correspond, and means for supplying said delayed vertical sync signals for each field which is displayed to said monitor in the order in which their undelayed corresponding vertical sync pulses occurred in said composite waveform to thereby effect said shifting.

4. For use with a system having a video monitor operative under the control of video signals and horizontal and vertical sync signals, a display tube, a film camera optically coupled to the screen of said tube and having a shutter and means for operating said shutter in response to electric signals and said camera having film transport means; the improvement constituting means for causing the raster of said display tube to shift vertically to thereby obscure the raster lines on a film during display of a sequence of fields, said improvements comprising:

means for producing a sequence of horizontal and vertical sync pulses corresponding with the pulses normally used for controlling the raster, horizontal and vertical sync pulse signal input means, means for supplying said sequence of horizontal sync pulses to said sync pulse input means of said monitor, binary counter means having input means for receiving clock pulses corresponding with vertical sync pulses in a sequence and having output means which change binary state in correspondence with input pulses that are counted, said counter means also having count enabling means, means for producing an exposure trigger signal, said counter means being enabled in response to occurrence of said trigger signal;

means controlled by the output state of said counter means for producing a sequence of vertical sync signals wherein each signal is delayed relative to its corresponding counted vertical sync pulse and each succeeding signal is increasingly delayed relative to the first vertical sync pulse that is counted, and means for supplying said delayed vertical sync signals in the same sequence to said sync pulse input means.

5. The system of claim 4 including:

divide-by-two pulse counter means for producing output pulses at television frame rate in response to receiving said vertical sync pulses at television field rate, said output pulses being supplied to said clock pulse input means of the aforesaid counter means.

6. The system of claim 4 including:

field delay means comprising first and second flip-flop means, said second flip-flop means being connected as a divide-by-two counter and being controlled to initiate its count by said first flip-flop means and said flip-flop means each having input means for receiving vertical sync pulses at the television field rate and each having output means, said second flip-flop means responding to said exposure trigger pulse by counting only one vertical sync pulse and producing an output signal for enabling said second flip-flop means to produce an output signal for each ensuing two vertical sync pulses supplied thereto, said output signals being supplied to the aforesaid clock signal input means of said counter means, said shutter operating means responding to occurrence of said exposure trigger signal by opening said shutter during the time before said second flip-flop means begins to count said vertical sync pulses, said shutter operating means responding to termination of said exposure trigger signal by closing said shutter means.

7. A system for shifting the raster on the picture tube of a television monitor vertically by substantially the distance of a raster line pair during presentation of a sequence of television fields within an exposure interval in order to obscure the raster lines on a film recording of said fields, said system having means for synchronizing a television monitor with horizontal and vertical sync pulses derived from a video waveform, a picture tube, a camera optically coupled to the screen of said tube, shutter means and shutter operating means and means for supplying a video signal representative of television picture information, said system comprising:

means for producing horizontal and vertical sync pulse trains, pulse generator means responsive to vertical sync pulses by producing a sequence of vertical sync pulse signals which are delayed in a repeatable pattern relative to the pulses in the train, counter means responsive to occurrence of a selected vertical sync pulse in said sequence that is to be counted by activating said counter means and responsive to having counted said sequence by deactivating said pulse generator means, means for producing an exposure trigger signal of predetermined duration, said counter means being enabled to count upon occurrence of said signal, field delay means comprising flip-flop means having input means for receiving said vertical sync pulses in said train and having output means, said flip-flop means responding to occurrence of said trigger signal by being inhibited from producing an output pulse corresponding with the selected vertical sync pulse of said sequence to occur after said trigger signal is initiated and said flip-flop means responding to subsequent vertical sync pulses by producing output signals for clocking said counter means, said shutter operating means responding to occurrence of said trigger signal while said flip-flop means is inhibited by opening said shutter means before counting of said vertical sync pulses begins, and said shutter operating means responding to said counter means having terminated said sequence by closing said shutter means.

8. The system of claim 7 including film transport means and means for producing a film transport command signal in response to said counter means having completed counting said sequence of vertical sync pulses.

9. A system for shifting the raster on the picture tube of a television monitor vertically during display of a sequence of television fields within an exposure interval, said system cooperating with a video signal recorder for supplying a composite video signal waveform representative of recorded scenes, a television monitor having input means for the composite video waveform and input means for horizontal and vertical sync pulses, a picture tube, a camera optically coupled to the screen of said tube, shutter means and electroresponsive shutter operating means and film transport means and electroresponsive transport operating means, said system comprising:

means for separating the horizontal and vertical sync pulses from said composite signal, gate means having input means for said horizontal sync pulses and for receiving delayed vertical sync signals and output means for supplying the gated signals to said sync signal input of said monitor, means for generating a trigger signal for initiating a photographic exposure interval, vertical sync pulse selecting means having an input for said vertical sync pulses and an output and being constructed and arranged for being controlled by said trigger signal to have its output state unchanged in response to occurrence of at least the first vertical sync pulse of the sequence that is delivered to its input and to produce output pulses corresponding with alternate incoming sync pulses thereafter, binary counter means having weighted outputs and having an enabling signal terminal and a clock signal input terminal, said signals from the output of said vertical sync signal selecting means being coupled to said clock signal input terminal and said counter means being operative to count said clock signals and produce a different binary weighted output for each pulse that is counted, said exposure interval trigger signal being coupled to said enabling signal terminal, means coupled with the outputs of said counter means and responsive to said counter means completing the counts of a pulse sequence by causing said counter means to terminate counting, integrator means for producing a ramp signal corresponding with each vertical sync pulse that is counted, means for producing signals having different values for each output state of said counter means corresponding with respective ramp signals, and means for summing said produced signals and ramp signals such that signals of constant value are produced at successively delayed times relative to the first pulse counted in the sequence, comparator means having input and output means, said comparator means receiving said constant value signals and being operative to produce a sequence of delayed vertical sync output signals corresponding with the respective vertical sync pulses that are counted, and means for coupling said delayed vertical sync pulse signals to said gate means for being gated to said monitor.

10. The system set forth in claim 9 including means responding to occurrence of said trigger signal for initiating an exposure by actuating said electroresponsive shutter operating means to open said shutter means in correspondence with said counter means having completed counting said sequence by actuating said shutter operating means to close said shutter.

11. The system set forth in claim 10 including means for producing a command signal for operating said electroresponsive film transport means in correspondence with said counter having completed counting said sequence.

12. The system set forth in claim 11 wherein said vertical sync pulse selecting means comprises a first flip-flop and a second divide-by-two flip-flop each of said flip-flops having input means for said vertical sync pulses, the first flip-flop being triggered by said exposure initiating signal to count the first vertical sync pulse in a sequence and to produce an output signal for enabling said second flip-flop to produce an output pulse for each two vertical sync pulses supplied to its input, such that during the delay produced by said flip-flop said shutter operating means will have time to open said camera shutter before counting of said sequence and shifting said raster begins.

13. For use with a video monitor having first input means for a composite video waveform including picture information and horizontal and vertical sync pulse signals, second input means for a train of horizontal and vertical sync pulse signals, means for modulating an electron beam with picture information signals, means for scanning said electron beam on said screen in a raster pattern in response to said sync pulse signals to produce a picture on said screen, a camera optically coupled to said screen and having a shutter and means for operating said shutter in response to electric signals: the improvement which enables shifting said raster on said screen by an amount no greater than the distance between a non-interlaced horizontal line during an exposure interval comprising;

means for supplying a composite video signal waveform which is representative of a static video picture to said first input means;

sync pulse stripper and separator means which when supplied with said composite waveform is operative to produce trains of horizontal and vertical sync pulses corresponding with pulses in said composite waveform;

gate means having an output coupled with said second input for sync signals to said monitor and having at least two inputs, one input for said train of horizontal sync pulses and another for vertical sync signals, means responsive to occurrence of said vertical sync pulses for producing a sequence of corresponding vertical sync signals which are successively increasingly delayed in respect to the first pulse in the sequence of vertical sync pulses with which they correspond, said delayed vertical sync signals and said horizontal sync pulses being supplied to respective inputs of said gate means.

* * * * *